(12) United States Patent
Peltz

(10) Patent No.: US 6,257,279 B1
(45) Date of Patent: Jul. 10, 2001

(54) PLURAL FUNCTION FLUID VALVE AND METHOD

(75) Inventor: David Peltz, Melbourne, FL (US)

(73) Assignee: GE-Harris Railway Electronics, L.L.C., Melbourne, FL (US)

( * ) Notice: Subject to any disclaimer, the term of this patent is extended or adjusted under 35 U.S.C. 154(b) by 0 days.

(21) Appl. No.: 09/110,122

(22) Filed: Jul. 6, 1998

Related U.S. Application Data

(60) Provisional application No. 60/051,759, filed on Jul. 7, 1997.

(51) Int. Cl.[7] ................................................. F16K 11/00
(52) U.S. Cl. .................................. 137/637.3; 137/625
(58) Field of Search .......................... 137/625, 625.18, 137/625.11, 637.3

(56) References Cited

U.S. PATENT DOCUMENTS

| | | | | |
|---|---|---|---|---|
| 1,566,605 | * | 12/1925 | Jamison | 137/625.3 |
| 2,391,126 | * | 12/1945 | Carter | 137/625.11 |
| 2,700,984 | * | 2/1955 | Gleasman | 137/625.11 |
| 2,940,473 | * | 6/1960 | Smith | 137/614.17 |
| 2,979,082 | * | 4/1961 | Neves | 137/625.11 |
| 3,987,819 | * | 10/1976 | Scheuermann | 137/637.3 |

* cited by examiner

Primary Examiner—John Fox
(74) Attorney, Agent, or Firm—Carter, Ledyard & Milburn; Scott Hayden, Esquire

(57) ABSTRACT

A plural function, three member, fluid valve includes a stationary base member which provides plural fluid ports connected to apparatus requiring or providing fluid control, a first movable member containing conduits which are selectively movable into alignment with the ports of the base member to select the function(s) to be performed, and a second movable member having a U-shaped passageway for selectively connecting passageways of the first member to execute the selected function, i.e., to form a fluid conduit from one port of the base member through a conduit in the first member, the U-shaped passageway in the second member and a second conduit in the first member to another port in the base member. Methods are also disclosed.

14 Claims, 3 Drawing Sheets

PLURAL FUNCTION FLUID VALVE AND METHOD

This application claims the benefit of U.S. Provisional Application Ser. No. 60/051,759 filed Jul. 7, 1997.

BACKGROUND OF THE INVENTION

This invention relates to fluid control valves and more particularly to three part valves and methods.

Fluid control valves to direct the flow of fluid, liquid or gas, are well known, and it has long been desirable to provide a valve capable of performing multiple functions. The typical multi-function fluid valve is of the linear displacement spool type consisting of a spool with several fluid inlet and outlet ports, each having a seating surface. Such known valves are capable of performing multiple functions by simultaneously or sequentially establishing various fluid flow paths through the spool. However, the number of functions performed by such valves is limited by the complexity of the valve construction and the physical size of the valve. Additionally, such valves requires a large number of precisely machined parts and seals, and maintenance and repair is generally costly.

Rotary valves are also well known and have fewer moving parts than spool valves. Typically, a rotor having a U-shaped passageway is rotated with respect to a ported surface of a valve body to interconnect various ports of the valve body through the rotor. Such valves may be two function valves, i.e., they may selectively connect one input port to one of two output ports, or vice versa. More complex rotary valves can simultaneously route more than a single fluid stream to various destinations by use of a more than one U-shaped passageway in the rotor.

Because rotary valves establish a flow path by aligning the channel of the rotor with selected ports of the stationary member and did not have cut-off valves within the rotor passageways, care had to be taken to ensure that non-selected ports were not "inadvertently" connected by rotation of the rotor relative to the stationary member. This limited the use of such valves to multiple functions carried out in a predetermined sequence.

The present invention obviates the need for use of a separate cutoff valve to prevent "inadvertent" flow paths from being establish by using a rotary valve having two movable members. Additionally, the use of two movable members increases the number of functions that can be performed by the valve. In the present invention, the first member selects the fluid function to be executed by aligning non-connected conduits with the selected ports. The second member can then execute the selected function by connecting the two conduits thereby establishing a fluid flow path between the selected ports through the first and second member.

Accordingly, it is an object of the present invention to obviate many of the limitations of known valves and to provide a novel multiple function fluid valve and method.

It is another object of the present invention to provide a novel valve and method capable of selecting one of several functions and then selectively executing the selected function.

It is another object of the present invention to provide a novel valve and method of connecting selected ports to establish a fluid communication path.

It is yet another object of the present invention to provide a novel plural function valve and method having separate moving members to select and then execute the desired function.

It is still another object of the present invention to provide a novel valve and method for performing complex fluid functions.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
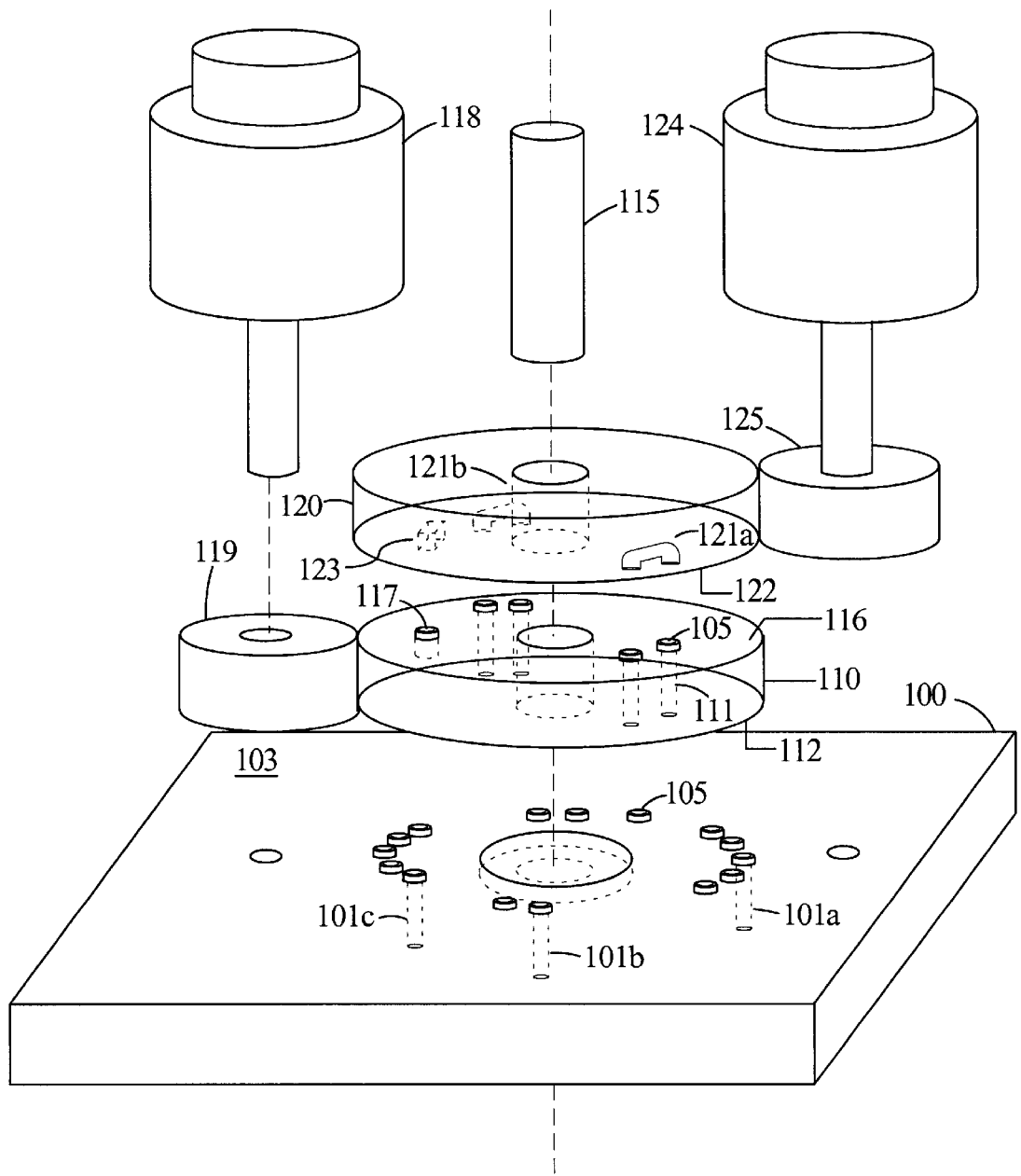
FIG. 1 is a simplified exploded view of one embodiment of a plural function, rotary fluid valve of the present invention.

With reference to FIG. 1 where one embodiment of the valve of the present invention is illustrated, the valve comprises a stationary base 100 and first and second rotors 110 and 120.

The base 100 may contain plural conduits 101 each having a port on the upper surface 103 thereof and being connected at the other end to a suitable apparatus (not shown) requiring or providing fluid control. Each of the ports on the surface 103 of the base may be provided with a suitable conventional sealing means 105 to prevent fluid leakage from the conduits 101 as the first rotor 110 is rotated relative to the base. The sealing means 105 preferably are self-lubricating so as not to impede the relative rotational movement between first rotor 110 and the base 100, and the force exerted by sealing member may be a function of the resilient means used to construct the seal or the pressure of the fluid sealed. Alternatively, the smoothness of the adjacent surfaces and the spacing between them may be sufficient to prevent leakage of the fluid from the ports.

The first rotor 110 is located adjacent to the base 100 and may contain plural conduits 111 passing from the lower surface 112 to the upper surface 116 thereof. The conduits 101 of the base 100 and the conduits 111 of first rotor 110 are positioned such that any conduit 111 of the first rotor 110 may be aligned with any selected conduit 101 of the base 100 by the rotational movement of first rotor 110 about the central valve axis provided by the pin 115. The ports for the conduits 111 on second surface 116 may be provided with a suitable conventional seal 105.

The second rotor 120 may contain plural U-shaped passageways 121 each having ports located on the lower surface 122 thereof. The passageways 121 are positioned to be selectively aligned with the ports of pairs (or larger groups) of conduits 111 in the lower rotor 110 by rotation of the upper rotor 120 relative thereto.

One or both of the rotors 110 and 120 may contain any suitable conventional biasing means 117,119 such as a spring biased detent for interconnecting the two rotors 110, 120 with a predetermined bias so that the first rotor, when driven in any suitable conventional manner such as the stepper motor 118 and drive 123 shown, may rotate both of the rotors 110, 120 as a single unit.

The upper rotor 120 may also be driven by any suitable conventional means such as the stepper motor 124 and drive 125 shown, the drive for the upper rotor 120 desirably being disengaged during the rotation of the lower rotor 110 to permit rotation of both rotors by the drive for the lower rotor 110. Rotation of the upper rotor 120 relative to the lower rotor 110 despite the bias provided by the latch 117,119 may be accomplished by engaging the drive for the upper rotor 120 while leaving the drive for the lower rotor 110 engaged.

It is to be understood that the rotors 110 and 120 may be driven by a toothed pinion gear, friction or belt drives, etc. and that rotary or linear solenoids or other mechanical, pneumatic, fluid, electrical or electromechanical devices may be substituted for the stepper motors illustrated.

In operation, a FUNCTION SELECT control signal may be applied to the motor 118 to rotate the lower rotor 110 so as to align the desired one or more of the conduits 111 of the lower rotor with selected ports 101 of the base 100. The upper rotor 120 may be coupled to lower rotor 110 such that the upper rotor rotates with the selective positioning of the lower rotor 110 by motor 118.

When the conduits 111 of the lower rotor are aligned with the selected conduits 101 of the base 100 as determined by the FUNCTION SELECT control signal, a FUNCTION EXECUTE control signal may be applied to the motor 124 to selectively rotate the upper rotor relative to the lower rotor 110 to align the ports of the passageway 121 in the upper rotor 120 with the ports 105 in the lower rotor 110, thereby creating a fluid passageway between the selected ports of the base 100 through the lower rotor 110 and the U-shaped passageway of the upper rotor 120. When fluid communication between the selected ports of the base 100 is no longer desired, an additional FUNCTION EXECUTE control signal may be used to cause motor 124 to return the upper rotor 120 to a neutral of closed position relative to the conduits of the lower rotor 110. Alternatively, relaxation of the FUNCTION EXECUTE control signal may permit the upper rotor 120 to return to a neutral or closed position under the influence of the bias of the means 117,119.

It should be understood that any number of functions with various complexities may be provided by the appropriate formation of passageways in the base and rotors, including the use of additional rotors as desired.

Figure 2:
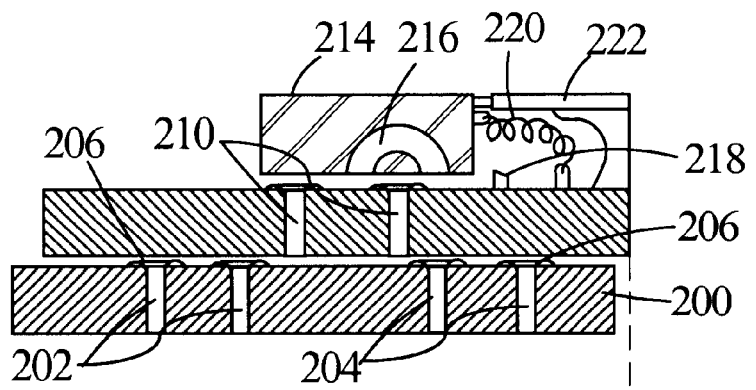
FIGS. 2a–2c are a second embodiment of a plural function linear fluid valve of the present invention.
Figure 2:
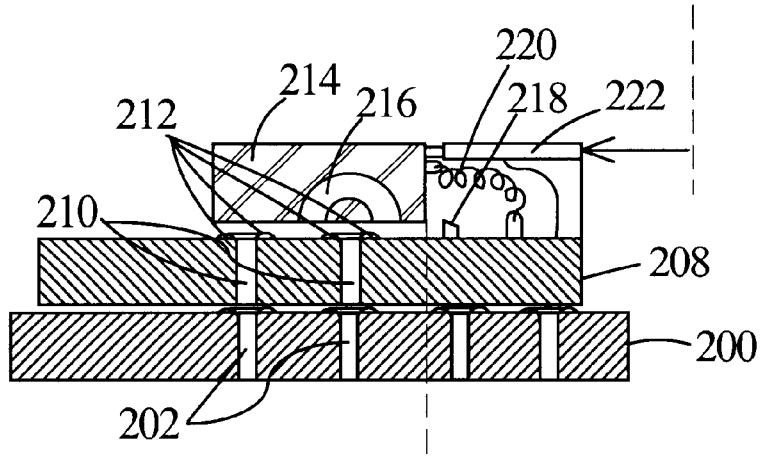
Figure 2:
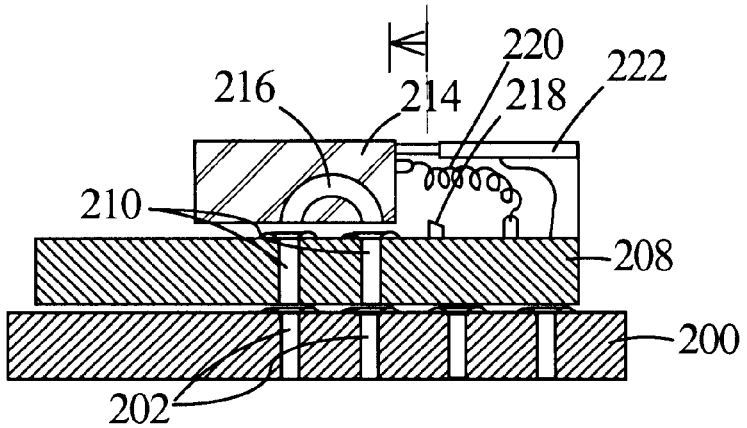

While rotary valves are desirable in that they do not have to be reversed to initiate a new valve cycle, the present invention may also be implemented in a linear valve such as shown in FIG. 2. With reference to FIG. 2(a), a base 200 is illustrated with two pairs of conduits 202 and 204 having ports on the upper surface surrounded by a seal 206. A lower slide 208 is illustrated having a single pair of conduits 210 having ports on the upper surface surrounded by suitable seals 212. An upper slide 214 is illustrated as having a single U-shaped passageway 216.

Note that the upper slide 214 is maintained in its rightmost or "valve closed" position against a stop 218 by a spring 220. Note also that the conduits 210 of the lower slide 208 are not aligned with either one of the pairs of passageways 202 or 204 of the base 200.

The position of the lower slide 208 relative to the base 200 may be controlled by means mounted on the base 200 in any suitable conventional way, e.g., the spring 220 and solenoid or pneumatic piston 222 used to control the position of the upper slide 214 relative to the lower slide 208. Note that the motive force for the piston may be provided by the fluid being controlled.

In FIG. 2(b), the lower slide 208 has been moved to align the conduits of the lower slide 208 with the conduits 202 of the base 200, it being understood that the conduits 210 of the lower slide could have been aligned with the conduits 204 of the base 200 by movement of the lower slide 208 to the right instead of to the left.

Note that the position of the upper slide relative to the lower slide 208 has not changed, and that while the conduits 202 of the base and 210 of the lower slide have been aligned, no fluid can flow therethrough.

As shown in FIG. 2(c), the upper slide 214 has been moved to the left by the actuation of the solenoid 222 against the bias of the spring 220, positioning the ports of the U-shaped passageway in alignment with the conduits 210 of the lower slide and permitting fluid flow between the pairs of conduits 202 in the base 200. When it is desirable to stop fluid flow, the power may be removed from the solenoid or pneumatic piston 222 to allow the upper slide 214 to return to the right under the bias of the spring 220. Note that no movement of the lower slide 208 relative to the base 200 is required to stop fluid flow in the pair of conduits 202.

Figure 3:
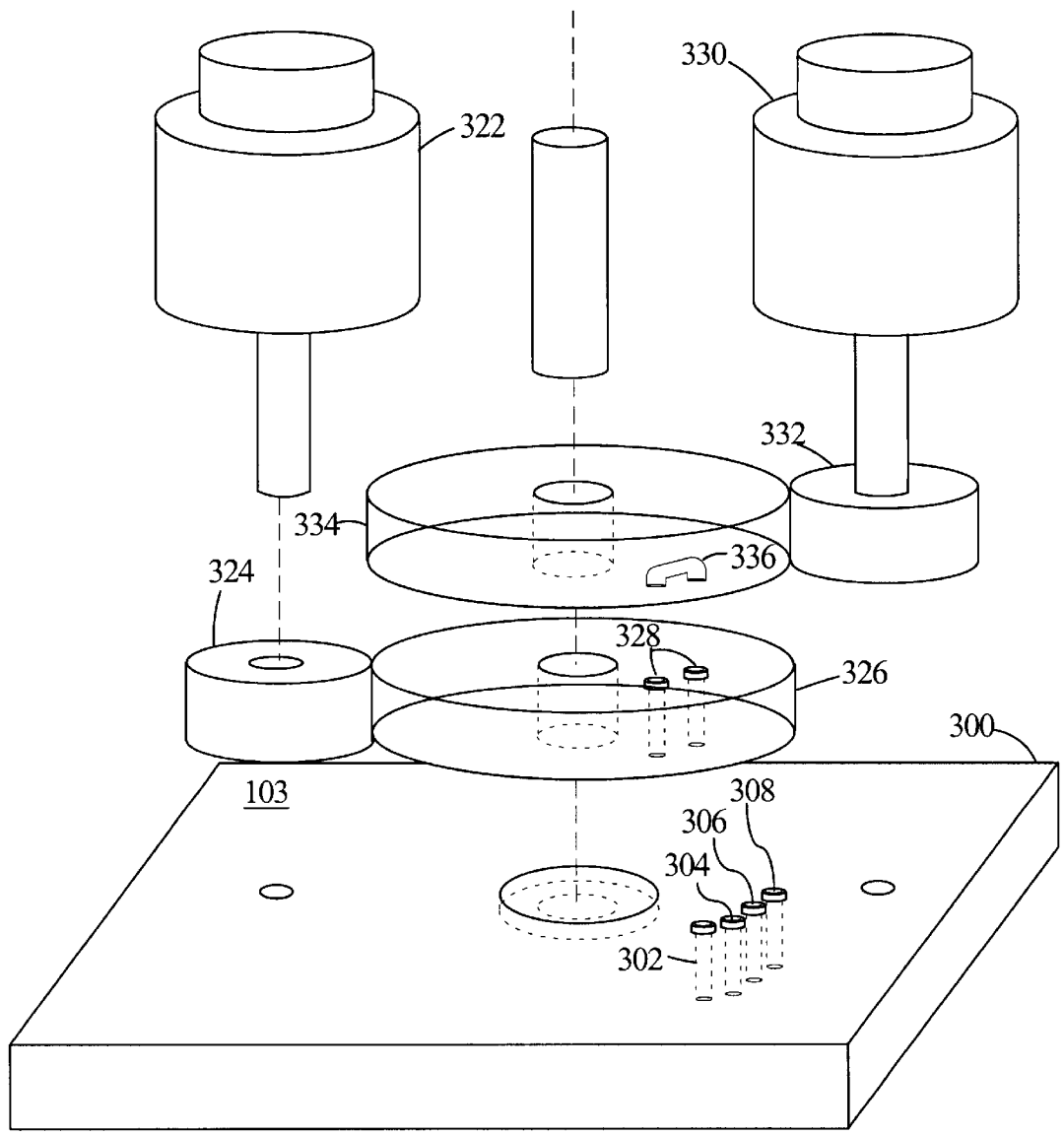
FIG. 3 is a simplified exploded view of an application of the valve of FIG. 1.

An embodiment of the rotary valve of the present invention in an application to control the pneumatic brakes on a railroad car is illustrated in FIG. 3. With reference to FIG. 3, the base 300 is provided with four conduits 302, 304, 306 and 308, conduit 306 being connected to the air reservoir (not shown), conduit 304 being connected to the brake cylinder (not shown), conduit 308 to the brake pipe (not shown) which extends along the train and provides compressed air, and conduit 320 being vented to the atmosphere. The adjacent ones of the conduits 302–308 are equally spaced.

A lower rotor 326 is provided with a single pair of conduits 328 spaced to conform to the spacing between adjacent ones of the conduits 302–308. An upper rotor 334 is also provided with a single U-shaped passageway 336 the ports of which are spaced to conform to the spacing between the conduits 328 of the lower rotor 326.

To charge the air reservoir from the brake pipe, a control signal CHARGE RESERVOIR may be sent to the stepper motor 322 to rotate the pinion 324 to position the lower rotor 326 so that the conduits 328 are aligned with the ports 306 and 308 of the base 300. Once the lower rotor 326 is correctly positioned, an EXECUTE FUNCTION control signal may be sent to the motor 330 to drive pinion 332 to rotate the upper rotor 334 to align the ports of the U-shaped passageway 336 and complete the passageway from the brake pipe port 308 through the conduit 328 and U-shaped passageway 336 back through the conduit 328 to the port 306 of the air reservoir. Once charging of the air reservoir is complete, the upper rotor may be rotated to a neutral position closing the passageway and ending the "charge reservoir" function.

The function of applying the brakes can be performed by the same valve by applying a APPLY BRAKE control signal to the motor 322 to position the first rotor 326 to align the conduits 326 with the base port 304 of the brake cylinder and the venting base port 302. Once this "braking" function is selected, the upper rotor 334 can be given the FUNCTION EXECUTE control signal to align the ports of the U-shaped passageway 336 with the conduits 328 and complete the passageway from the brake cylinder port 304 through the conduit 328 and U-shaped passageway 336 back through the conduit 328 to the port 302 to atmosphere. Once the brake cylinder has been charged to the selected pressure to apply the brakes, the upper rotor 334 may be rotated to a neutral position closing the passageway and maintaining the "apply brakes" function at the selected pressure.

The function of releasing the brakes can be performed by the same valve by applying a RELEASE BRAKE control signal to the motor 322 to position the first rotor 326 to align the conduits 326 with the base port 304 of the brake cylinder and the base port 306 of the air reservoir. Once this "braking" function is selected, the upper rotor 334 can be given the FUNCTION EXECUTE control signal to align the ports of the U-shaped passageway 336 with the conduits 328 and complete the passageway from the air reservoir port 306 through the conduit 328 and U-shaped passageway 336 back through the conduit 328 to the port 304 of the brake cylinder. Once the charging of the brake cylinder, and the release of the brakes, is complete, the upper rotor may be rotated to a neutral position closing the passageway and ending the "release brakes" function.

Thus the same valve, with minimum movement between the parts, can perform multiple functions with only two control signals, i.e., a "function select" and a "execute function" signal. Additional functions may be added simply by providing additional appropriately positioned ports, which ports may be connected to the same or different sources as desired, without making any change to the upper rotor and/or without increasing the number of actuating devices. Of course, additional U-shaped or other complex channels may also be provided in the upper rotor for the simultaneous execution of plural functions.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A plural function fluid valve comprising:
   a base having a surface defining plural ports;
   a first member having a first surface movable relative to the surface of said base, said first member having plural conduits extending from the first surface thereof so that movement of said first member relative to said base may selectively align the ports defined by the surface of said base with the conduits of said first member;
   a second member having a first planar surface movable relative to the first member, said second member having at least one channel with ports defined by said first planar surface, so that movement of said second member relative to said first member may selectively align the ports of said second member with the conduits of said first member to thereby establish fluid communication between one of the plurality of ports of said base to a another of the plurality of said base through said first and second members.

2. The valve of claim 1 including means for effecting relative movement between said base and said first member.

3. The valve of claim 1 where first and second members are rotatable about a common axis generally normal to the surfaces of the first member.

4. The valve of claim 1 including means for effecting relative movement between said first member and said second member.

5. The valve of claim 4 including the means for preventing relative movement between said first and second members during relative movement between said base and said first member.

6. The valve of claim 1 wherein said channel is generally u-shaped.

7. The valve of claim 1 whereby said conduits of said first member are normal to said first surface of said first member.

8. The valve of claim 1 further comprising means for determining the position of first member relative to said base.

9. The valve of claim 1 further comprising means for sealing the ports of said base to the ports of said first member.

10. The valve of claim 1 whereby the movement of said first member is rotational about an axis normal to the plane of the first surface of said first member.

11. The valve of claim 10 whereby the movement of said second member is rotational about an axis in common with said first member.

12. The valve of claim 1 whereby the movement of said first member is linear in the plane of first surface of said first member.

13. The valve of claim 1 whereby the movement of said second member is linear in the plane of the first surface of said second member.

14. A rotary valve for performing plural pneumatic functions in the control of a train comprising:
   a base having ports connected with the atmosphere, the brake cylinder, the air reservoir and the brake pipe, adjacent ports being equally spaced apart;
   a first rotor having two conduits extending therethrough, the spacing between said two conduits being the same as the spacing between adjacent ports of said base;
   a second rotor having a U-shaped passageway with ports spaced apart the same distance as the spacing between said two conduits;
   means for selectively rotating said first rotor to position said two conduits into alignment with selected ports of said base to thereby select a function to be performed; and
   means for selectively rotating said second rotor independently of said first rotor and about an axis common with the rotation of the first rotor to position the ports of said U-shaped passageway into alignment with said two conduits to thereby execute the selected function.

* * * * *